Figure 1:
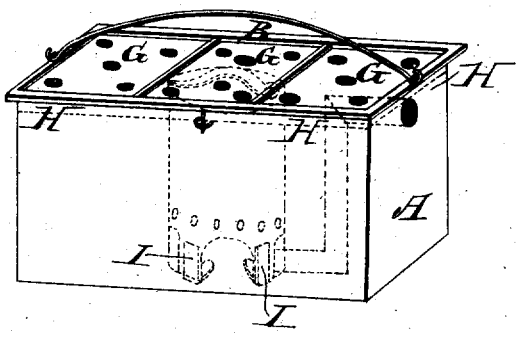
Figure 2:
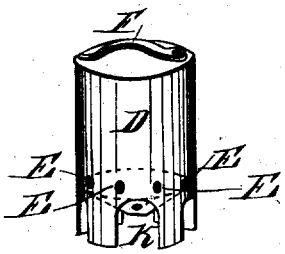
Figure 3:
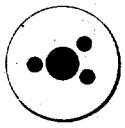
Figure 4:
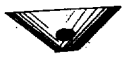

9827X

E. DABOLL.

FOOT STOVE.

Patented July 1, 1836.

9827x

July 1, 1836

Ezekiel Daboll. of Canaan State of Connecticut.

Letters Patent.

The schedule referred to in these Letters Patent and making part of the same containing a description in the words of the said Ezekiel Daboll himself of his "improvement in the Foot Stove." —

To all to whom these presents shall come.

Be it known that I Ezekiel Daboll, of the town of Canaan in the County of Litchfield, and State of Connecticut, have invented a new and useful foot-stove and that the following is a full and exact description thereof 1. A box made of tin or some other thin metal, made square or in any other form — and made of a size convenient to carry by the hand and convenient to rest the foot upon when sitting.

2. A wooden frame forming a rack or grate to rest the feet upon is fitted to the top plate of the box and the top plate is made to open and shut by being hung on one side with butts or hinges, and fastened down on the other side by a hook or otherways 3.d The top plate is perforated by several holes, and is fastened to the wooden frame by nailing — the top plate has all its edges turned down about one half inch so as to shut close against the sides and within the body of the box.

4. Near the top of one or more of the sides — or on the top plate, a hole is made about one cubic inch in size. Attach to this hole on the inner side of the box is a tube or conductor, which passes down between the furnace mentioned below and the side of the box and convey the cold air to the bottom of the furnace mentioned below.

5. within the box is placed a furnace about one third the size of the box The furnace is made of sheet iron or some other thin metal, within this furnace is placed charcoal, or any other fuel if preferred for burning. The furnace stands on legs, which are in length about one fifth the height of the furnace. The furnace with its legs is about one third of an inch shorte 9827X July 1, 1836 than the depth of the box, leaving just space for the spring hereafter mentioned
The bottom of the furnace is concave, and perforated by holes so as to form
a grate – There are several holes on the sides of the furnace which are made
a little above the bottom of the furnace, as to the size of these holes, I would
inform any Machanic – that for a furnace which is about four inches in di-
ameter, one hole in the centre of the concave bottom about five eighths of an
inch in diameter – and three others near the centre – each about one third
of an inch in diameter is sufficient. —
And on the sides of the furnace a little above the bottom about eight
holes, each hole about one fourth of an inch in diameter is sufficient
These holes may increased or diminished according to the size of the stove
or to increase or diminish the heat.

6. The furnace is entirely covered with a lid, and on this lid or
underneath the top plate of the box is fixed a spring made in an Elip
tic or spiral form or other ways and is of such size & strength, that
when the top of the box is shut down – it will hold the furnace secure
-ly in its place.

7. At the bottom of the box, is fixed three or more upsets or stays,
which rise up so as to press against the sides of the furnace, and assist
in keeping the furnace in its place.

8. The outside of the box is ornamented by being japanned or bronzed
or with paints or gilding.

9. I distinctly state that those parts of this stove which I claim as my
own invention and on which alone I claim Letters Pattent are the following
1. the hanging of the lid or top plate of the box with the turning down
of the edges. 2. the tube or conductors conveying the air to the bottom of
the furnace – 3. The furnace in all its parts as applied to the foot stove
4. The upsets or stays at the bottom with the lid on top of the furnace
together with the spring to keep the furnace in its place. 5. The applicatn
of ornament to the outside of the foot stove, and such a control & dispo
-tion of the heat; that the ornament is not injured by the heat, These things
I claim as my own invention & for these do I claim Letters Patent of the United
States — Witnesses A. H. Woodbridge
Charles F. Van Antwerp Ezek^l. Dabott ([illegible]) [illegible]